Figure 1:
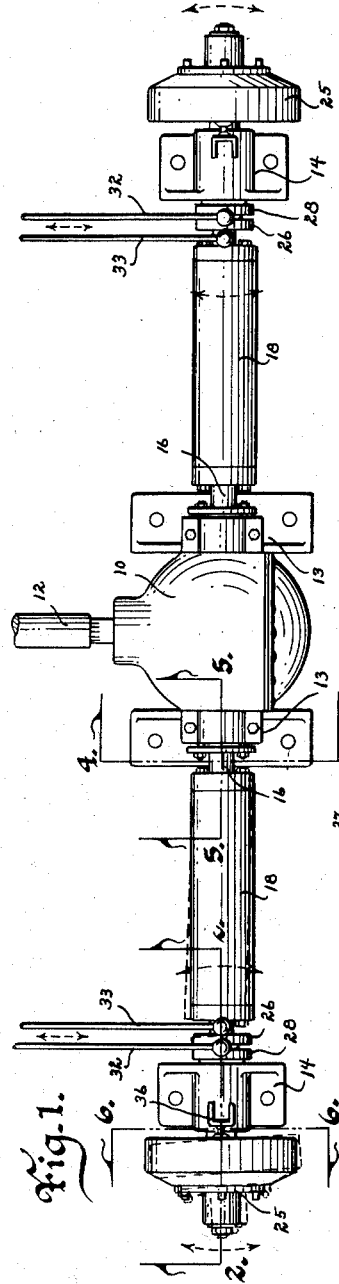

March 1, 1960

R. R. COOK 2,926,735

VEHICLE CHASSIS, TRANSMISSION AND
STEERING ASSEMBLY MEANS

Filed Feb. 2, 1959

3 Sheets-Sheet 1

Witness
Edward P Seley

Inventor
Roger R. Cook
by M. Talbert Dick
Attorney

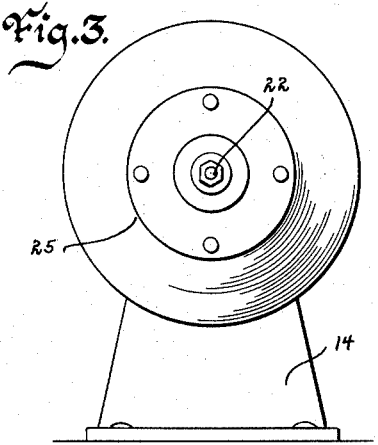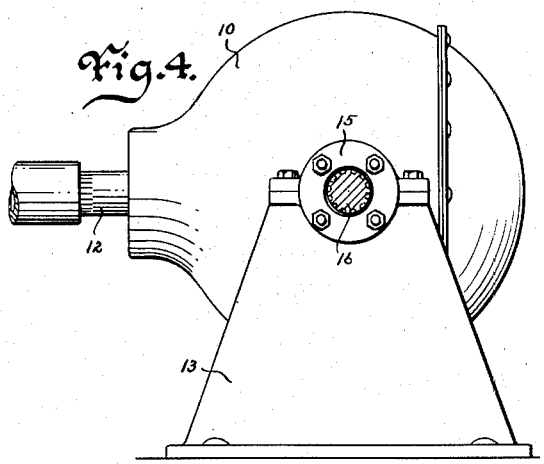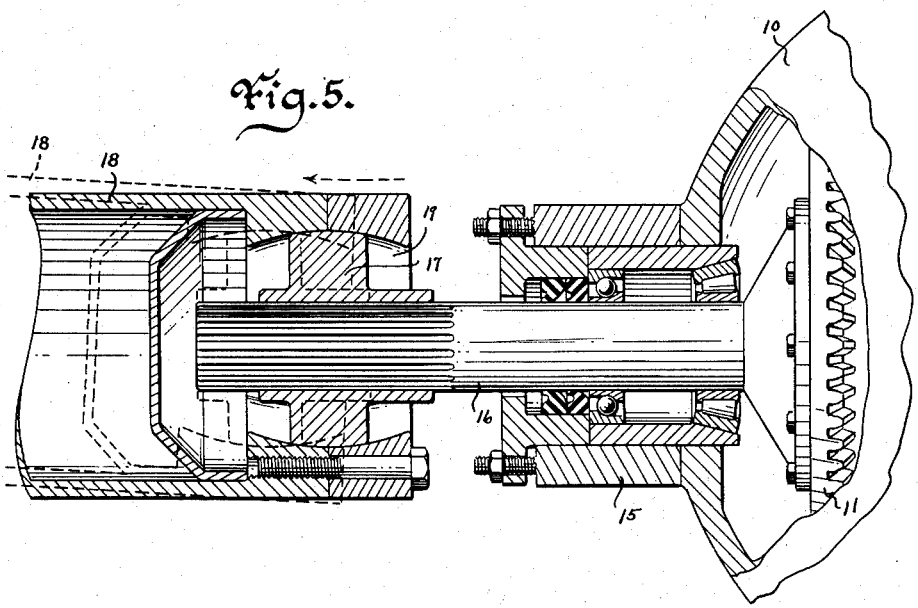

March 1, 1960 R. R. COOK 2,926,735
VEHICLE CHASSIS, TRANSMISSION AND
STEERING ASSEMBLY MEANS
Filed Feb. 2, 1959 3 Sheets-Sheet 3

Witness
Edward P. Seeley

Inventor
Roger R. Cook
by M. Talbert Dick
Attorney

United States Patent Office 2,926,735
Patented Mar. 1, 1960

2,926,735

VEHICLE CHASSIS, TRANSMISSION AND STEERING ASSEMBLY MEANS

Roger R. Cook, Des Moines, Iowa

Application February 2, 1959, Serial No. 790,476

7 Claims. (Cl. 180—42)

This invention relates to associated mechanical movements, and more particularly to the combination of a unique vehicle transmission, chassis, and steering assembly means. While the combination of parts is particularly adapted for vehicles, the same principles may be used in other machines besides that of road vehicles.

There are three major inadequate structures in most vehicles, i.e., they do not have independent wheel steering means, their universal joints are objectionable, and wheel vibrations are objectionably transmitted to the manual steering means.

Therefore, one of the principal objects of my invention is to provide a mechanical movement for the individual wheels of vehicles that permits the relative angle of the steering parts to be easily and smoothly changed for each of the wheels of the vehicle.

A further object of this invention is to provide a mechanical movement for the steering means that is simple, quick, and positive in adjustment.

A still further object of this invention is to provide a mechanical movement for the steering means of vehicles that progressively changes relative to the angles and which is always in ratio to its movable adjusting means.

A still further object of my invention is to provide a ball and socket type joint for vehicles that secures the ball portion and socket portion against relative rotation, thereby making possible the accurate transmission of rotary power from one shaft means to another shaft means.

A still further object of my invention is to provide a universal power joint that has little power loss.

A still further object of this invention is to provide a universal power joint for vehicles and the like that is quiet in operation.

A still further object of this invention is to provide a universal closed joint for vehicles that permits the retention of lubrication.

Still further objects of my invention are to provide a new vehicle transmission, chassis and steering assembly means that is economical in manufacture and durable in use.

These and other objects will be apparent to those skilled in the art.

Figure 2:
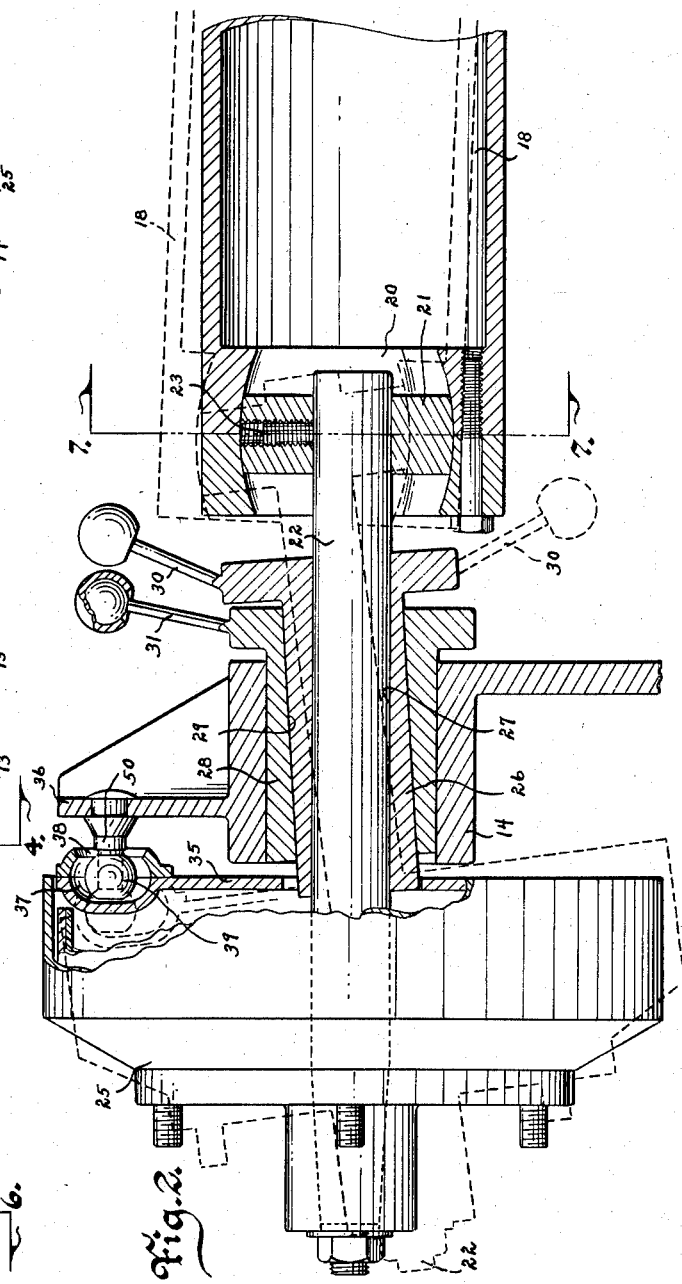
Figure 6:
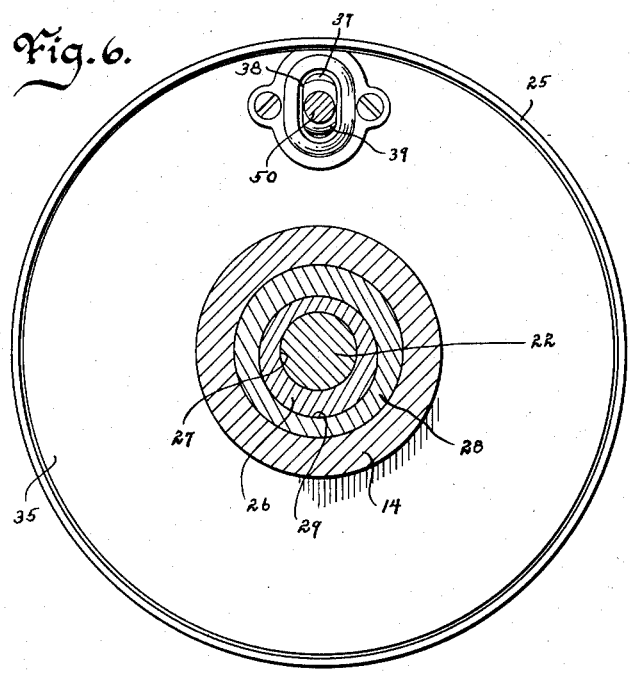
Figure 7:
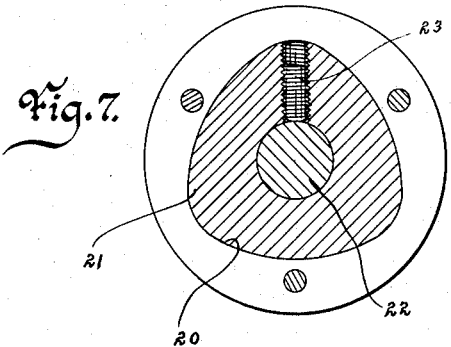

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a top plan view of my assembly for vehicles, including my independent wheel steering means, transmission means, and universal joint structure, Fig. 2 is an enlarged longitudinal section of the steering means and universal joint, and is taken on line 2—2 of Fig. 1, Fig. 3 is an enlarged end view of one of the vehicle wheels and its support, Fig. 4 is an enlarged side view of the differential and is taken on line 4—4 of Fig. 1, Fig. 5 is an enlarged longitudinal sectional view of the device taken on line 5—5 of Fig. 1, Fig. 6 is an enlarged cross sectional view of the steering means taken on line 6—6 of Fig. 1, and Fig. 7 is a cross sectional view of the universal joint taken on line 7—7 of Fig. 2.

While my transmission of power is unique, the differential is substantially standard. The numeral 10 designates the usual transmission housing having the usual gears 11 operatively connected to the usual power drive shaft 12. This shaft is operatively secured to the usual prime mover (not shown). Such differentials usually supply power to at least two of the wheels of the vehicle. If the vehicle is to have all four wheels powered, obviously two of these differentials with my assemblies attached thereto would be needed. However, inasmuch as they would be duplicates, I will only explain my assembly for the driving and controlling of two wheels. Furthermore, and inasmuch as each wheel assembly at each side of the differential will be a duplicate of the other, I will use like numbers for both sides thereof. The description of any one side unit or element will apply equally to the other side unit or element.

The numerals 13 and 14 designate supports or portions of the vehicle chassis for holding the differential, shafts, etc., of the equipment as shown in the drawings. Obviously any suitable means may be used for supporting the various parts and tying them together into an operable unit. Extending from each side of the differential housing 10 is the usual axle shaft bearing 15 having the common and well known cone, roller bearings, ball bearings, packing glands, and like. These well known packing glands prevent grease from escaping from the transmission housing. Operatively secured to the appropriate gear 11 in the housing 10, and rotatably extending through the bearing means 15, is a stub axle shaft 16 as shown in Fig. 5. Each of these shafts 16 has its outer end portion splined for slidably receiving thereon the ball portion 17 of a ball and socket joint. The numeral 18 designates a cylinder having in its inner end portion a socket portion 19 embracing the ball portion 17. In the other and outer end portion of the cylinder 18 is a socket portion 20 which slidably embraces the ball portion 21 of a ball and socket assembly. These ball and socket units, i.e., 17 and 19, and 20 and 21, are both of substantially the same unique character of each other, and which are more fully illustrated in Fig. 7 of the drawings. This particular ball and socket unit structure is described in detail in my application for United States Letters Patent on a Universal Joint, Serial Number 753,974, filed August 8, 1958. As the structure of these two universal joint units is substantially identical, I will explain the operation of the ball and socket assembly 20 and 21, it being understood that the description of one is substantially the description of the other. The wheel axle 22 extends through the ball portion 21 and is secured thereto by any suitable means such as a set screw 23. The female socket portion 20 has its two ends open but its inner wall is not that of a perfect circle in cross section. Instead, each cavity is that of an equal triangle construction having slightly outwardly curved sides and rounded corners, as shown in Fig. 2 and Fig. 7. Likewise, the ball portion 21, which is the core of the universal joint, is longitudinally curved to complement the longitudinal curvature of its socket 20. The periphery of the ball portion 21 is also not a perfect circle in cross section but is that of an equal triangle construction having slightly curved sides and rounded corners. Thus, the outside periphery of the ball core 21 closely conforms to the inside wall of the socket portion 20 and, therefore, the ball portion 21 may swing and slide laterally in the socket portion, as shown by broken lines in Fig. 2, but due to the triangular construction of the core and socket, the core portion does not have independent rotation relative to the socket. Therefore, by my construction and arrangement of parts, the cylinder 18 does have limited movement relative to the differential and also the wheel axle 22 has movement relative to the cylinder 18. However, whenever the shaft 16 is rotated, the cylinder 18 will be rotated and also the wheel axle shaft 22 will be rotated. By splining the ball core portion 17 to the shaft 16, it may be longitudinally slid on the shaft 16. Such a universal joint is positive, silent in operation, and will satisfactorily retain lubrication.

On the outer end of each of the axle wheel shafts 22 is the usual wheel drum and brake housing 25 as shown in Fig. 1. Rotatably embracing the axle shaft 22 and to the inner side of the wheel drum 25 is the axle bearing 26. This axle bearing 26 has a cylindrical outer surface but is unique in that its bore 27 that embraces the shaft 22 extends at an angle to its longitudinal center as shown in Fig. 2. By this arrangement the bore 27 is concentric with the shaft 22 while the periphery of the axle bearing is eccentric with the shaft 22 and extends longitudinally at an angle to the shaft 22. The numeral 28 designates a second axle bearing rotatably embracing the periphery of the axle bearing 26. This axle bearing 28 has the bore 29 which rotatably embraces the periphery of the member 26 and this bore extends at an angle to the longitudinal center of the part 28. The bore 29 therefore is concentric with the inner axle bearing 26 but the cylindrical periphery of this outer axle bearing 28, when in certain positions of its rotation relative to the inner bearing, will be eccentric with the periphery of the cylindrical periphery of the inner bearing 26. This is made possible by the structure of the bearing member 28 being similar to that of the structure of the inner bearing member 26. Thus, the two axle bearing members may adjustably complement each other by rotating them relative to each other, i.e., the longitudinal plane of the periphery of the outer axle member 28 may be parallel to the longitudinal axis of the shaft 22, or by adjustably rotating the axle bearing members relative to each other, the periphery of the outer bearing member 28 may be placed at various angles relative to the longitudinal axis of the shaft 22, as shown by broken lines in Fig. 2. Furthermore, the angles may be at either side of the longitudinal axis of the shaft 22 for turning the wheels of the vehicle. Obviously, either of the bearing members 26 and 28 may be rotated relative to the other and attain desired results. A more rapid action would be to rotate both the members 26 and 28 simultaneously but in opposite directions relative to each other. Therefore, the numeral 30 designates a radially extending lever arm on the bearing 26. The numeral 31 designates a like radially extending lever arm from the bearing 28. Operating rods 32 and 33 are secured to the arms 30 and 31, respectively, so that the rotation of the bearing members 26 and 28 may be manually operated at a distance from the bearing members, such as the seating compartment of the vehicle. The support 14 rotatably embraces the cylindrical periphery of the axle bearing 28 as shown in Fig. 2. While the outer brake drum housing and wheel hub 25 rotate with the hub axle 22, the inner web 35 of the brake drum is held from rotation. This is standard practice on all vehicles. The numeral 36 designates a projection on the support 15. Any suitable means may be used to flexibly connect the web 35 to the support projection 36. In the drawings I show an elongated socket 37 having a slot opening 38 facing the part 36. The numeral 39 designates a ball in the socket 37. The numeral 50 designates a shaft secured to the part 36, extending through the slot opening 38, and slidably extending into the ball 39. By this arrangement the brake drum portion may move universally in various directions relative to the part 36 but such movements will be limited.

From the foregoing, it will be seen that I have provided a positive steering means to the wheels of the vehicle, and the assembly has flexibility in substantially all directions while delivering positive power to the wheels of the vehicle. As before noted, this is possible of application to each of the four or more wheels of a vehicle. When the lever 31 is moved, the outer bearing 28 will be rotated, and when the lever arm 30 is moved, the inner bearing member 26 will be rotated. Inasmuch as each of the bearing members 26 and 28 has a bar extending at an angle to its longitudinal center axis, the eccentrically mounted bearing members may at one position of their rotation complement each other to the extent that the periphery of the bearing member 28 will be exactly parallel with the shaft 22. However, the lever arms 31 and 30 may be operated so that the periphery of the outer bearing member may be adjusted to extend outwardly and rearwardly, or adjusted to extend outwardly and forwardly. With wheels (not shown) on the hubs 25, any such mounted wheel may be easily and positively steered. All four wheels may be steered merely by the movement of the lever arms 32 and 33. If desired, these lever arms may be suitably linked together so that only one control would be necessary to steer all four wheels. By the bearings 26 and 28 complementing each other and by rotating them simultaneously in opposite directions, the vehicle wheels need not be lowered or raised relative to the ground surface during the rotation of the wheels. Obviously, if only one bearing 26 were used, this maintaining of shaft elevation would not be possible. Therefore, for most uses, both an inner and an outer bearing member are needed. If for some reason or other or for some machinery purpose, it is desirable that the shaft elevation be changed during the operation of the device, it is merely a matter of the relative rotation and positioning of the bearing members 26 and 28.

Some changes may be made in the construction and arrangement of my vehicle chassis, transmission, and steering assembly means without departing from the real spirit and purpose of my invention, and it is my intention to cover by my claims, any modified forms of structure or use of mechanical equivalents which may be reasonably included within their scope.

I claim:

1. In combination, a differential having an output shaft, a cylinder having a socket in each end portion; each of said sockets being in cross section substantially triangular and longitudinally concave curved, a ball core slidably secured to said output shaft, and in one of the sockets of said cylinder, a wheel axle, a ball core on said wheel axle, both of said ball cores being in cross section substantially triangular and longitudinally convex curved, an inner bearing member having a cylindrical periphery and a bore embracing said wheel axle; said bore extending at an angle to the longitudinal axis of said inner bearing member, an outer bearing member having a cylindrical periphery and bore rotatably embracing the cylindrical periphery of said inner bearing member; said bore of said outer bearing member extending at an angle to its longitudinal axis, a support bearing embracing the cylindrical periphery of said outer bearing member, and means for individually rotatably adjusting said inner and outer bearing members.

2. In combination, a differential having an output shaft, a cylinder having a socket in each end portion; each of said sockets being in cross section substantially triangular and longitudinally concave curved, a ball core splined on said output shaft, and in one of the sockets of said cylinder, a wheel axle, a ball core on said wheel axle, both of said ball cores being in cross section substantially triangular and longitudinally convex curved, an inner bearing member having a cylindrical periphery and a bore embracing said wheel axle; said bore extending at an angle to the longitudinal axis of said inner bearing member, an outer bearing member having a cylindrical periphery and bore rotatably embracing the cylindrical periphery of said inner bearing member; said bore of said outer bearing member extending at an angle to its longitudinal axis, a support bearing embracing the cylindrical periphery of said outer bearing member, and means for individually rotatably adjusting said inner and outer bearing members.

3. In combination, a differential having an output shaft, a cylinder having a socket in each end portion; each of said sockets being in cross section substantially triangular and longitudinally concave curved, a ball core slidably secured to said output shaft, and in one of the sockets of said cylinder, a wheel axle, a ball core on said wheel axle, both of said ball cores being in cross section substantially triangular and longitudinally convex curved, an inner bearing member having a cylindrical periphery and a bore embracing said wheel axle; said bore extending at an angle to the longitudinal axis of said inner bearing member, an outer bearing member having a cylindrical periphery and bore rotatably embracing the cylindrical periphery of said inner bearing member; said bore of said outer bearing member extending at an angle to its longitudinal axis, a support bearing embracing the cylindrical periphery of said outer bearing member, a wheel brake means on said wheel axle having a part that rotates with said axle and a stationary part, a flexible means for securing the stationary part of said wheel brake means operatively to said support bearing, and means for individually rotatably adjusting said inner and outer bearing members.

4. In combination, a differential having an output shaft, a cylinder having a socket in each end portion; each of said sockets being in cross section substantially triangular and longitudinally concave curved, a ball core slidably secured to said output shaft, and in one of the sockets of said cylinder, a wheel axle, a ball core on said wheel axle, both of said ball cores being in cross section substantially triangular and longitudinally convex curved, an inner bearing member having a cylindrical periphery and a bore embracing said wheel axle; said bore extending at an angle to the longitudinal axis of said inner bearing member, an outer bearing member having a cylindrical periphery and bore rotatably embracing the cylindrical periphery of said inner bearing member; said bore of said outer bearing member extending at an angle to its longitudinal axis, a support bearing embracing the cylindrical periphery of said outer bearing member, a wheel brake means on said wheel axle having a part that rotates with said axle and a stationary part, a ball socket on the stationary part of said wheel brake means, a ball in said socket, a shaft operatively secured to said support bearing having one of its end portions extending into said ball socket and slidably into said ball, and means for individually rotatably adjusting said inner and outer bearing members.

5. In combination, a differential having two output shafts; each of said two output shafts having associated therewith a cylinder having a socket in each end portion; each of said sockets being in cross section substantially triangular and longitudinally concave curved, a ball core slidably secured to said output shaft, and in one of the sockets of said cylinder, a wheel axle, a ball core on said wheel axle; both of said ball cores being in cross section substantially triangular and longitudinally convex curved, an inner bearing member having a cylindrical periphery and a bore embracing said wheel axle; said bore extending at an angle to the longitudinal axis of said inner bearing member, an outer bearing member having a cylindrical periphery and bore rotatably embracing the cylindrical periphery of said inner bearing member; said bore of said outer bearing member extending at an angle to its longitudinal axis, a support bearing embracing the cylindrical periphery of said outer bearing member, and means for individually rotatably adjusting said inner and outer bearing members.

6. In combination, a differential having an output shaft, a cylinder operatively secured to said output shaft, a wheel axle, a ball core on said wheel axle; said ball core being in cross section substantially triangular and longitudinally convex curved, an inner bearing member having a cylindrical periphery and a bore embracing said wheel axle; said bore extending at an angle to the longitudinal axis of said inner bearing member, an outer bearing member having a cylindrical periphery and bore rotatably embracing the cylindrical periphery of said inner bearing member; said bore of said outer bearing member extending at an angle to its longitudinal axis, a support bearing embracing the cylindrical periphery of said outer bearing member, and means for individually rotatably adjusting said inner and outer bearing members.

7. In combination, a differential having an output shaft, a cylinder operatively secured to said output shaft, a wheel axle, a ball core on said wheel axle; said ball core being in cross section substantially triangular and longitudinally convex curved, an inner bearing member having a cylindrical periphery and a bore embracing said wheel axle; said bore extending at an angle to the longitudinal axis of said inner bearing member, an outer bearing member having a cylindrical periphery and bore rotatably embracing the cylindrical periphery of said inner bearing member; said bore of said outer bearing member extending at an angle to its longitudinal axis, a support bearing embracing the cylindrical periphery of said outer bearing member, and means for individually rotatably adjusting said inner and outer bearing members from points remote from said inner and outer bearing members.

References Cited in the file of this patent

UNITED STATES PATENTS

| | | |
|---|---|---|
| 1,175,242 | Dailey | Mar. 14, 1916 |
| 1,325,062 | Noel | Dec. 9, 1919 |
| 1,950,567 | Race | Mar. 13, 1934 |